(12) United States Patent
Agrawal et al.

(10) Patent No.: US 11,016,808 B2
(45) Date of Patent: *May 25, 2021

(54) MULTI-TENANT LICENSE ENFORCEMENT ACROSS JOB REQUESTS

(71) Applicant: Microsoft Technology Licensing, LLC, Redmond, WA (US)

(72) Inventors: Prashant D. Agrawal, Kirkland, WA (US); Samuel Ng, Bellevue, WA (US); Jake Carver Swenson, Seattle, WA (US); Milan Gada, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/678,709

(22) Filed: Nov. 8, 2019

(65) Prior Publication Data

US 2020/0151013 A1 May 14, 2020

Related U.S. Application Data

(63) Continuation of application No. 13/741,182, filed on Jan. 14, 2013, now Pat. No. 10,474,502.

(51) Int. Cl.
*G06F 9/50* (2006.01)
(52) U.S. Cl.
CPC ................... *G06F 9/5011* (2013.01)
(58) Field of Classification Search
None
See application file for complete search history.

(56) References Cited

U.S. PATENT DOCUMENTS

| | | | | |
|---|---|---|---|---|
| 6,138,143 A | * | 10/2000 | Gigliotti | G06F 16/2379 709/203 |
| 2004/0019890 A1 | * | 1/2004 | Verbeke | G06F 9/5055 718/100 |
| 2009/0049443 A1 | * | 2/2009 | Powers | H04L 67/10 718/100 |
| 2012/0054771 A1 | * | 3/2012 | Krishnamurthy | G06F 9/4881 718/105 |
| 2012/0198462 A1 | * | 8/2012 | Cham | G06F 9/4881 718/103 |

* cited by examiner

*Primary Examiner* — Wynuel S Aquino
(74) *Attorney, Agent, or Firm* — Workman Nydegger

(57) ABSTRACT

Scheduling job request submitted by multiple tenants in a manner that honors multiple software license agreements for the multiple tenants. A queue persistently stores job requests that await scheduling. A job state tracking component persistently tracks a state of the job requests, and perhaps provides job requests into the queue. A software license agreement enforcer reviews the job requests in the queue, selects one or more job requests should be scheduled next based on the license agreements, and provide the selected job requests to a resource manager. A subscriber/publisher pool may be used to the various components to communicate. This decouples the communication from being a simple one-to-one correspondence, but instead allows communication from a component of one type to a component of the other type, whichever instance of those components happens to be operating.

20 Claims, 5 Drawing Sheets

MULTI-TENANT LICENSE ENFORCEMENT ACROSS JOB REQUESTS

CROSS-REFERENCE TO RELATED APPLICATIONS

This application is a continuation of U.S. application Ser. No. 13/741,182, entitled "MULTI-TENANT LICENSE ENFORCEMENT ACROSS JOB REQUESTS," which was filed on Jan. 14, 2013, and which will issue on Nov. 12, 2019, as U.S. Pat. No. 10,474,502, the contents of which are incorporated by reference herein in their entirety.

BACKGROUND

High performance computing allows a customer to use compute resources in order to accomplish a job. Typically, the customer will engage in a software license agreement with a provider of compute resources, which often obliges the compute resources provider to provide a certain level of service using the compute resources. Often, a provider of compute resources will have multiple customers (i.e., multiple tenants), each having one or more software license agreements.

As job requests are received by the provider, a scheduler schedules the job requests so that they are accomplished in a manner that satisfies all of the software license agreements. Failure to do so can often result in a breach of the software license agreement, resulting in loss of good will, and monetary loss for the provider. Accordingly, the provider ensures that all of the machines providing the compute resources are properly functioning, and that there is sufficient redundancy to handle failure scenarios. Often, the compute resources are thus physically located in an area in which they can be maintained by the provider.

Moving the compute resources to a cloud computing environment presents significant challenges. A cloud computing environment can often guaranty a certain number of machines to provide the compute resources, but cannot often guaranty that the same machine will be fully operational for the entire lifetime of the job, or that proper network connectivity will be maintained for the entire lifetime. Thus, the stability of the virtual machines in the cloud computing environment may not be as high.

BRIEF SUMMARY

At least one embodiment described herein relates to a system for scheduling job requests submitted by multiple tenants that are protected by multiple software license agreements. In some embodiments, the system can be made to be stateless so as to be helpful in an environment in which computing resources, and components of the system itself, are less stable, such as in a cloud computing environment.

The system includes a queue that persistently stores job requests that await scheduling. A job state tracking component persistently tracks a state of each at least some of the job requests. Should that original job state tracking component cease functioning, another job state tracking component can continue with the tracking function since the state of each job request is persisted. A software license agreement enforcer reviews the job requests in the queue, selects one or more job requests that should be scheduled next based on the license agreements, and provides the selected job requests to a resource manager.

There may also be multiple instances of the software license agreement enforcer and the resource manager that can take over should another instance cease operation. This is possible since the state tracking information and the queue is persisted. Furthermore, a subscriber/publisher pool may be used to allow the various components to communicate. This decouples the communication from being a simple one-to-one correspondence, but instead allows communication from any component of one type to any component of the other type, whichever instances of those types of components that happen to be operating.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a system for scheduling job request submitted by multiple tenants is described. The system schedules the job request in a manner that honors multiple software license agreements for the multiple tenants. In some embodiments, the system can be made to be stateless so as to be helpful in an environment in which computing resources, and components of the system itself, are less stable, such as in a cloud computing environment.

The system includes a queue that persistently stores job requests that await scheduling. A job state tracking component persistently tracks a state of each at least some of the job requests. Should that original job state tracking component cease functioning, another job state tracking component can continue with the tracking function since the state of each job request is persisted. A software license agreement enforcer reviews the job requests in the queue, selects one or more job requests that should be scheduled next based on the license agreements, and provides the selected job requests to a resource manager.

There may also be multiple instances of the software license agreement and the resource manager that can take over should another instance cease operation. This is possible since the state tracking information and the queue is persisted. Furthermore, a subscriber/publisher pool may be used to the various components to communicate. This decouples the communication from being a simple one-toone correspondence, but instead allows communication from a component of one type to a component of the other type, whichever instance of those components happens to be operating.

Some introductory discussion of a computing system will be described with respect to FIG. 1. Then, the principles of operation of the job request scheduling will be described with respect to FIGS. 2 through 4. Then there will be discussion of a cloud computing environment in which the principles described herein may be effectively employed in some embodiments with respect to FIG. 5.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
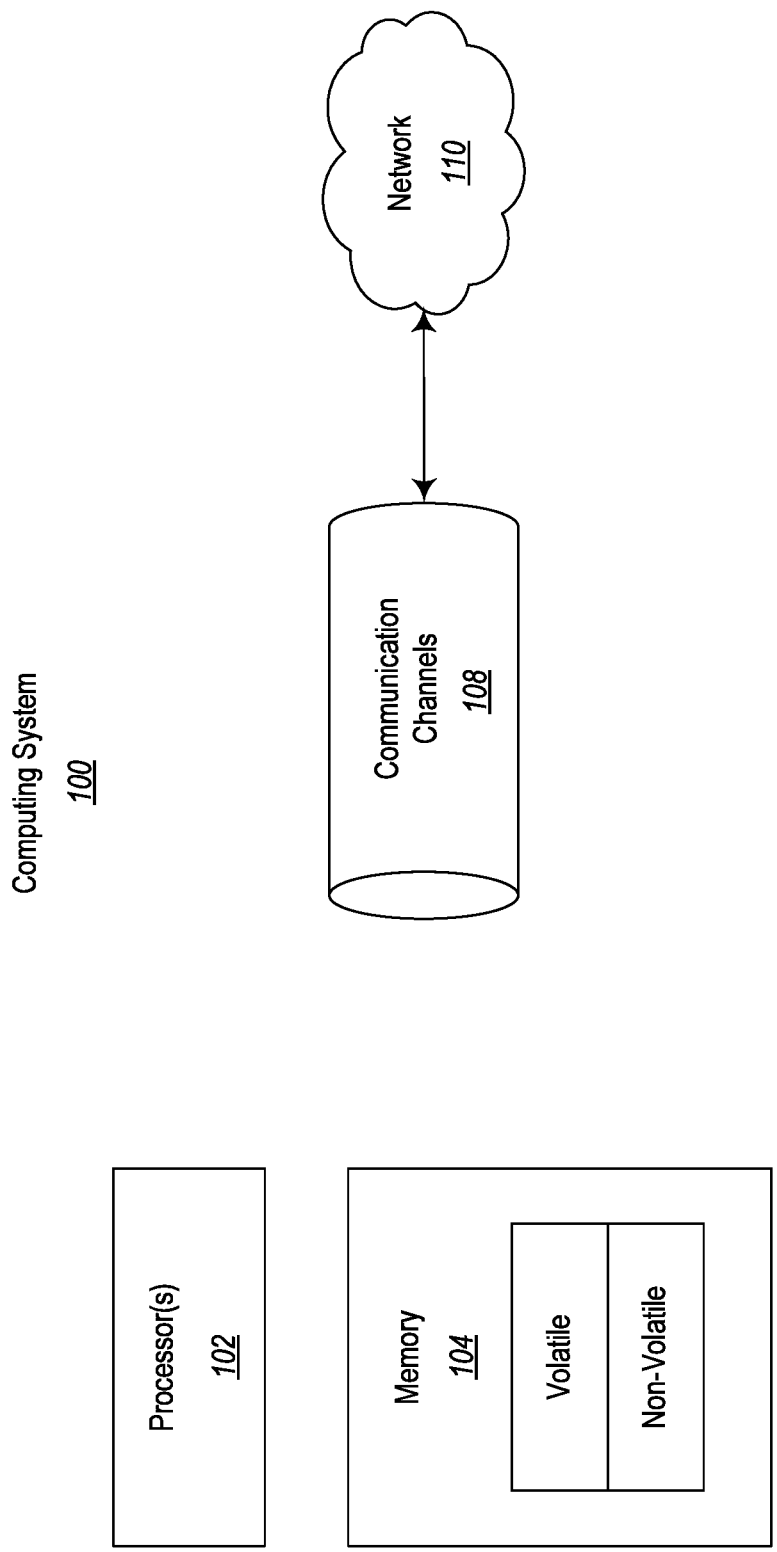
FIG. 1 abstractly illustrates a computing system in which some embodiments described herein may be employed.

As illustrated in FIG. 1, in its most basic configuration, a computing system 100 typically includes at least one processing unit 102 and computer-readable media 104. The computer-readable media 104 may include physical system memory, which may be volatile, non-volatile, or some combination of the two. The computer-readable media may also include non-volatile mass storage such as physical storage media. If the computing system is distributed, the processing, memory and/or storage capability may be distributed as well.

As used herein, the term "executable module" or "executable component" Scan refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
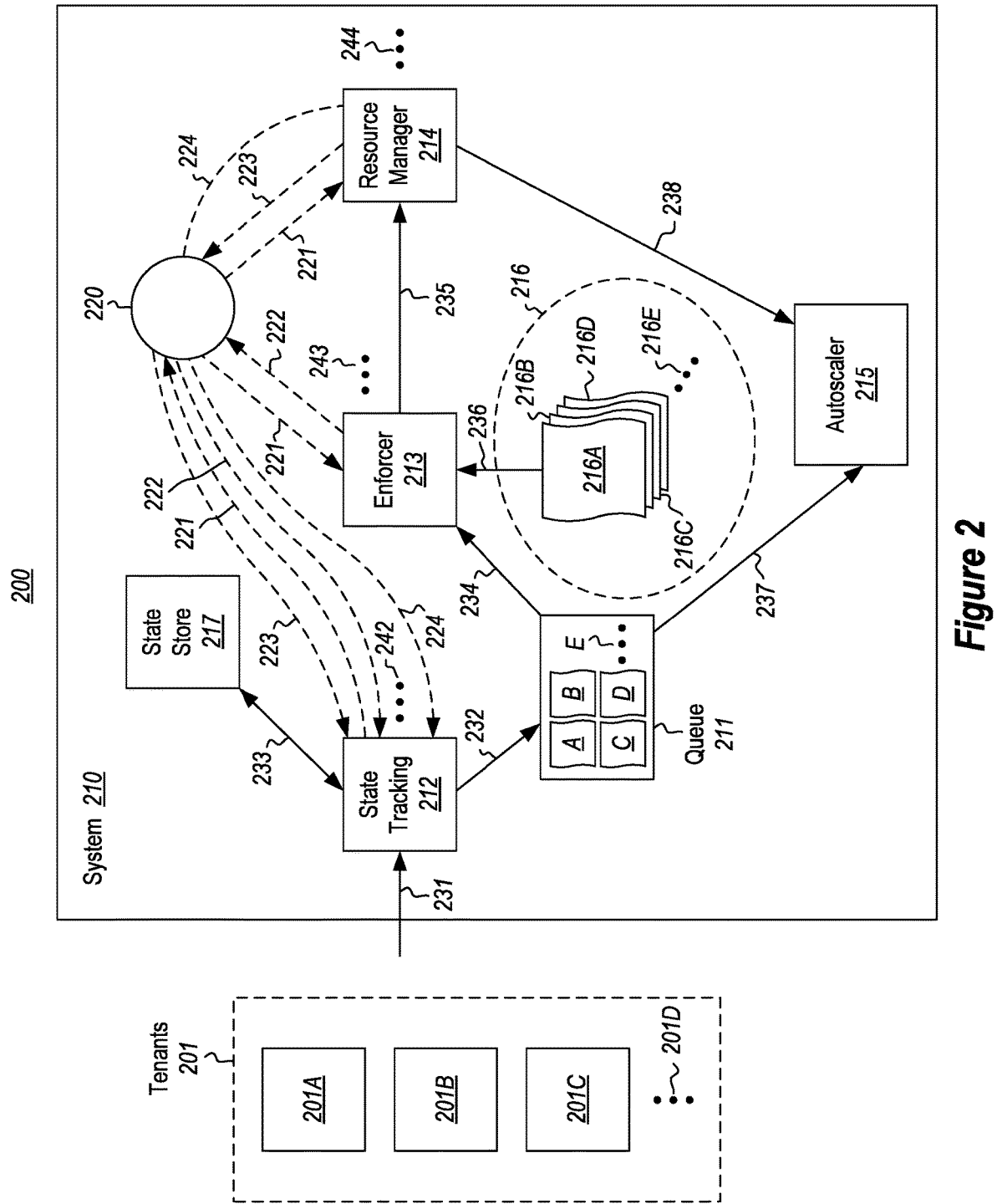
FIG. 2 illustrates an environment in which multiple tenants communicate with a job processing system, and includes abstract functionality of the job processing system.

FIG. 2 illustrates an environment 200 that includes a plurality of tenants 201 that submit job requests to a job performance system 210. Although not required, the job performance system 210 may be a high performance computing system in which the submitted jobs are performed using one or more compute nodes. However, the principles described herein are also applicable to any mechanism in which submitted jobs are accomplished using computing resources.

Each tenant may be any entity that has one or more software license agreements that are to be honored by the job performance system. As such, the entity may be any identifiable entity for which a software licensing agreement may be set up. As examples, the tenant may be an individual or an entity that may represent an identifiable collection of individuals, such as a company, institution, school, group, union, or subset of any of the same. The tenant could also be a computing entity, such as a software module, application, or service, that is capable of automatically generating job requests.

Referring to FIG. 2, the tenants 201 are illustrated as expressly including three tenants 201A, 201B and 201C. However, the ellipses 201D symbolically represent that the principles of the structure and operation of the job performance system 210 described herein are not limited to any particular number of tenants. There could be as few as one tenant, but with no upper limit on the number of tenants. Each tenant might qualify for the performance of a job request in accordance with a single software license agreement, or might qualify for the performance of the job request in accordance with one of multiple software license agreements.

The job performance system includes a queue 211 configured to persistently store job requests that await scheduling. The queue 211 may be any structure that is capable of persistently storing job requests. There is no requirement as to the ordering of the job requests within the queue. While the order that the job request is received might (or might not) have some input into the calculation of the order in which the job requests are scheduled, the primary determining factor is that the job requests are scheduled so as to satisfy all software licensing agreements across all tenants 201 that have submitted job requests to the job processing system 210.

Optionally, in addition, additional factors that may be considered include tenant policy. For instance, a tenant may have a policy that certain types of jobs have higher priority to the client than others, and that if the software license agreement is not placed at risk, such priority should be honored by scheduling the higher priority job first.

The queue 211 is capable of "persisting" the job requests in a manner that the job requests within the queue 211 would remain even should power be lost to the queue 211. Furthermore, the queue 211 may be accessed by any of multiple instances of the other elements within the job performance system 210. This is one of several features of the embodiment of FIG. 2 that allow the other elements of the job performance system 210 to be stateless. That said, the principles described herein are not limited to embodiments in which one, some or all of the other elements within the job performance system are stateless.

The queue 211 is illustrated as including four job requests A, B, C and D. However, the ellipses E represent that the queue 211 may include any number of job queues. Furthermore, the number of job requests in the queue 211 would naturally increase as new job requests are received from the tenants 201, or would naturally decrease as job requests are completed or cancelled. Thus, the number of jobs in the queue would be dynamic under normal conditions in which new job requests are being received and in which job requests are being scheduled, completed, and perhaps cancelled.

A job state tracking component 212 persistently tracks a state of each of the job requests. In some embodiments, the job state tracking component 212 is also responsible for receiving new job requests from the tenants 210 (as represented by arrow 231) and/or placing the job request in the queue 211 (as represented by arrow 232). The job state tracking component 212 may thus be a state machine in which each job corresponds to a particular state, and in which particular events cause a transition from one state to another. In a particular embodiment, the state is tracked in a persisted database. For instance, referring to FIG. 2, the state may be stored in persistent state store 217. The interaction between the state tracking component 212 and the state store 217 is illustrated by bi-directional arrow 233, allowing the state tracking component 212 to update the state store 217.

The job state tracking component 212 "persistently" tracks state in the sense that the state continues to exist despite a failure of any given instance of the job state tracking component 212 so that the state may continue to be accessed by a surviving instance of the job state tracking component 212. The concept that there may be multiple instances of the job state tracking component 212 concurrently and harmoniously operating is represented by the ellipses 242. Accordingly, rather than refer to "the job state tracking component 212" hereinafter, the term is often modified to "a job state tracking component 212" in order to further emphasize that in this multi-instance embodiment, it does not matter which instance of multiple job state tracking component actually performs a described act.

In this description and in the claims, certain terms will be given to particular states and particular notifications. However, this is not to imply that the state and notifications actually have such names in the machine code. It is merely used as a convention herein to distinguish one state from another, and to distinguish one notification from another. For instance, when a given job request is newly received and entered into the queue 211, the job request is assigned a particular state which will be referred to in the description and in the claims as "pending", in that the job request is not yet scheduled, but is in the queue waiting for scheduling.

The job state tracking component 212 may persistently track each job request for at least a portion of the lifetime of the job request, but in the embodiments described herein, tracks the state of the job request from the time that the job request is pending in the queue until the time that the job request is completed or cancelled. However, in the multi-instance embodiment, the job state tracking component 212 tracks the job request for at least a portion of the lifetime of the request since an instance of the job state tracking component 212 that began tracking the state may not be the instance of the job state tracking component 212 that completes the state tracking for a particular job request. In fact, the responsibility for state tracking for a given job request might transfer between many instances of the job state tracking component 212. This makes the multi-instance embodiment quite resilient, and workable in a cloud computing environment.

Figure 3:
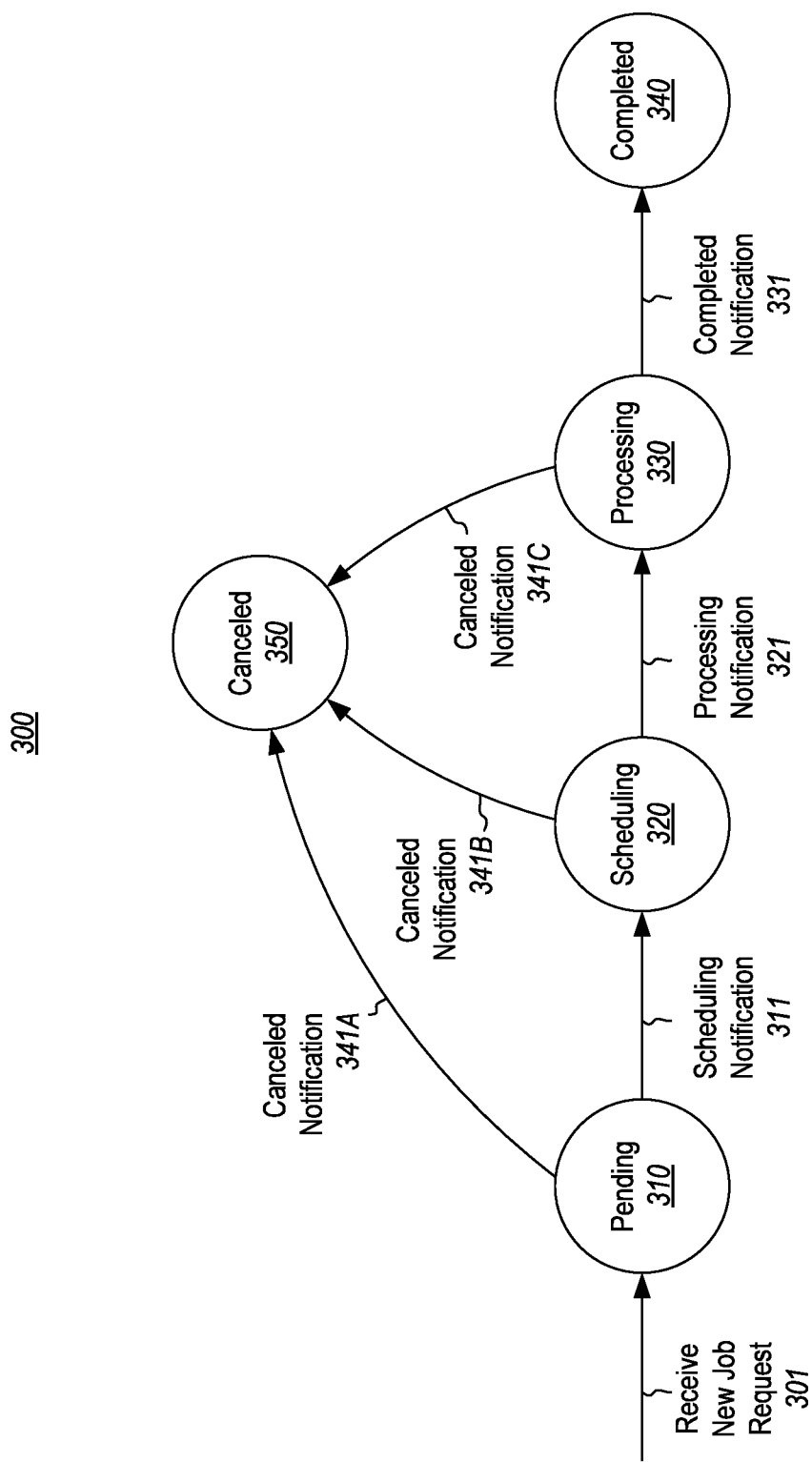
FIG. 3 illustrates a state transition diagram that follows a lifetime of a particular job request.

FIG. 3 illustrates a state transition diagram 300 that follows a lifetime of a particular job request. In response to a new job request event (represented by arrow 301), the corresponding job request is placed into the pending state 310. The remainder of the transitions diagram 300 is explained with respect to the remaining description of FIG. 2 below.

The job performance system 210 also includes a software license agreement enforcer 213. The enforcer 213 reviews the job requests in the queue 211 (as represented by arrow 234), selects the job request(s) that should be scheduled next based on license agreements 216, and provide the selected one or more job requests to a resource manager 214 (as represented by arrow 235). This review may be a continuous process in which the next job request to be scheduled is provided to the resource manager 214 at a particular time in the continuous spectrum. Alternatively, the enforcer 213 performs the review in a cyclical basis at particular discrete times, selects one or more jobs at those discrete times, and provides the one or more selected job requests to the resource manager 214 accordingly at discrete time intervals. The accessing of the software license agreements 216 by the enforcer 213 is represented by arrow 236.

The license agreements 216 include the software license agreements that govern the levels, quality and/or quantity of service to be offered to the various tenants 201, and thus include all of the software license agreements to be enforced for multiple tenants. The license agreements 216 need not be expressed textual representations, but rather may be in any computer-readable form that allows the logic of the enforcer 213 to interpret the relevant terms to be applied to job request scheduling for the various tenants. In order to keep the job processing system 210 stateless, the licensing agreements 216 may also be persisted.

The licensing agreements 216 are illustrated as including four licensing agreements 216A, 216B, 216C and 216D. This is a different number than the number of illustrated tenants (i.e., three) so as to emphasize that the principles described herein do not require a one-to-one correlation between tenants. For instance, one tenant might be governed by multiple software license agreements. Furthermore, one tenant may be a subset of another tenant, and thus be governed by the software license agreement for the larger tenant as well as a software license agreement for the subset tenant. For instance, the larger tenant might be a corporation, whereas the subset tenant might be a particular division of the corporation. The ellipses 216E again represents that the principles described herein are not actually limited to the number of software license agreements that are in the set consulted by the software license agreement enforcer 213.

The ellipses 243 represents that there may be multiple instances of the software license agreement enforcer that are each drawing upon the queue 211. Accordingly, hereinafter, "the software license agreement enforcer 213" may be referred to as "a software license agreement enforcer 213" to emphasize that in a multiple enforcer embodiment, it does not matter which instance of the multiple enforcers actually filters the job request out and provides the job request to a resource manager 214 as represented by arrow 235.

The resource manager 214 schedules compute resources that support each of the job requests. The principles described herein apply regardless of the structure of the resource manager 214, and regardless of how the resource manager operates. The resource manager 214 may be any component capable of scheduling job requests as submitted by the enforcer 213.

The resource manager 214 may be a dedicated component within the job processing system 210. Alternatively or in addition, the resource manager 214 may be a pluggable component, and perhaps provided by a provider external to the job processing system 210.

The ellipses 244 represents that there may be multiple instances (which need not be identical instances) of the resource scheduler enforcer that are each drawing upon the queue 211. Accordingly, hereinafter, "the resource manager 214" may be referred to as "a resource manager 214" to emphasize that in a multiple resource manager embodiment, it does not matter which instance of the multiple resource managers actually schedules the job request.

In one embodiment, a resource manager 214 schedules compute resources (such as compute nodes in high performance computing) that are completely within a data center in a cloud computing environment, or perhaps distributed across multiple data centers in a cloud computing environment. In that case, the compute resources might include, for example, virtual machines. Alternatively or in addition, a resource manager 214 may schedule compute resources that are tenant compute resources, being provided by the tenant environment. For instance, suppose that the tenant 201A submits a particular job request. A resource manager 214 might satisfy the job request by using compute resources within a data center, within the tenant 201A, or a combination.

Optionally, an autoscaler component 215 observes the queue 211 (as represented by arrow 237) and the utilization of computer resources (as represented by arrow 238), and based on the observation, increases or decreases the compute resources available to a resource manager 214. The autoscaler component 215 may also change the SLA agreements within certain bounds when the load is heavy or light. Thus, if resource utilization becomes closer to full utilization, compute resources may be added to the availability of the resources manager 214. On the other hand, if the compute resources are predictably underutilized by a significant safety margin, the number of compute resources available to a resource manager 214 may be decreased. This adjustment in the amount of available compute resources may be completely automated, or perhaps partially automated in the sense that a person might set certain policy regarding the condition(s) under which compute resource availability should be increased and/or decrease. In the multi-instance embodiment in which multiple instances of the resource manager 214 are available, the same or different policy may be applied to each instance of the resource manager 214.

As mentioned previously, there may be multiple instances of any of the state tracking component 212, the software license agreement enforcer 213, and the resource manager 214. This allows the job processing system 200 to be resilient in an environment in which any given instance of any of these components might cease function. For instance, in a cloud computing environment, virtual machines often have a temporary lifetime, which may not last the entire lifetime of any given job request. This means that the instances supported by such virtual machine likewise may begin and cease operating during the lifetime of the job request. Nevertheless, the statelessness of the system allows one instance of a component of a particular type to pick up where another left off without itself needing to keep track of any state.

This resiliency may be further enhanced by having a communication system between components in which the channel of communication is not specific to a given instance. Rather, a communication channel is used that is not instance specific, but rather facilitates communication only between any instance of a given source type to any instance of a given target type. As an example, the more general communication channel may be a publisher/subscriber pool 220. The source instance of the source type publishes an event into the pool 220, the event being of a type that all instances of a target type have subscribed to. However, there is a mechanism to ensure that once one instance of the target type has received the event, the event is no longer available to the other instances.

For instance, any given instance of the job state tracking component 212 is configured to publish start notifications 221 into the pool 220 when a particular job request is added to the queue. The start notifications 221 are subscribed to by the instance(s) of the software license agreement enforcer 213, and/or by the instance(s) of the resource manager(s) 214.

Furthermore, any given instance of the software license agreement enforcer 213 is configured to publish scheduling notifications 222 into the pool 220 when a job request is provided to an instance of a resource manager 214 for scheduling. The scheduling notification 222 is subscribed to by the instance(s) of the state tracking component 212, such the only one instance of the state tracking component 212 receives (or at least acts on) the scheduling notification 222.

Furthermore, any given instance of the resource manager 214 is configured to publish processing notifications 223 into the pool 220 when a job request begins processing by compute resources. The processing notification 223 is subscribed to by the instance(s) of the state tracking component 212, such the only one instance of the state tracking component 212 receives (or at least acts on) the processing notification 223.

Additionally, any given instance of the resource manager 214 is configured to publish completed notifications 224 into the pool 220 when a job request completes processing by compute resources. The completed notification 224 is subscribed to by the instance(s) of the state tracking component 212, such the only one instance of the state tracking component 212 receives (or at least acts on) the completed notification 224.

When a job state tracking component 212 receives a scheduling notification 222, the job state tracking component 212 transitions a state of the job request from a pending state to a scheduling state by interacting with state store 217. For instance, referring to FIG. 3, in response to scheduling notification event 311, the state transitions from the pending state 310 to the scheduling state 320.

When a job state tracking component 212 receives a processing notification 223, the job state tracking component 212 transitions a state of the job request from a pending state to a processing state again interacting with state store 217. For instance, referring to FIG. 3, in response to processing notification event 321, the state transitions from the scheduling state 320 to the processing state 330.

When a job state tracking component 212 receives a completed notification 224, the job state tracking component 212 transitions a state of the job request from a processing state to a completed state by again interacting with state store 217. For instance, referring to FIG. 3, in response to completed notification event 331, the state transitions from the processing state 330 to the completed state 340.

In some embodiments, the job request is not removed from the queue 211 when the software license agreement enforcer 213 provides the job request to a resource manager 214. Instead, perhaps the state tracking component 212 renders the job request invisible to the software license agreement enforcer 213 such that the job request is ignored in further selection of the next job request for scheduling. In that case, once the job request is in a completed state, the state tracking component 212 may further cause the job request to be removed from the queue 211.

In addition to receiving new job requests from the tenants 201, a state tracking component 210 may also receive a job cancellation request from the tenants 201. In that case, the state tracking component 212 that receive the cancellation request publishes a cancellation notification into the pool 220. The cancellation notifications are subscribed to by the instance(s) of the software license agreement enforcer 213, and/or by the instance(s) of the resource manager(s) 214.

The cancellation request may be received by a state tracking component 212 at any point, and thus may be acted upon anytime prior to completion of the job request. For instance, referring to FIG. 3, in response to a cancellation request event 341 (represented by individual events 341A, 341B and 341C for respective states pending 310, scheduling 320, and processing 330), the state transitions to a cancelled state 350. Thus, each job request begins with a pending state 310, and ends with either a completed state 340 or a cancelled state 350.

Figure 4:
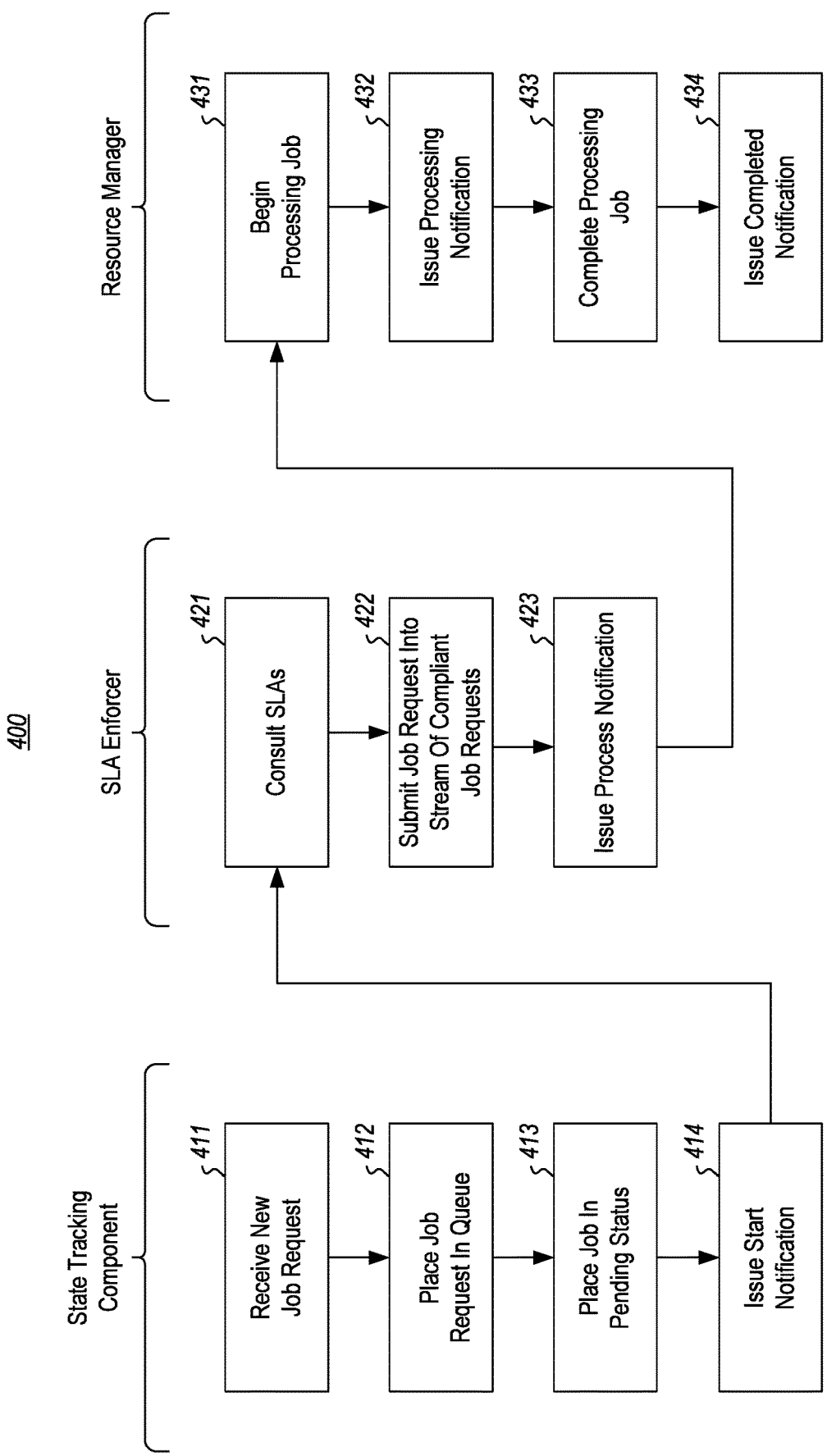
FIG. 4 illustrates a flowchart of a method for processing job requests.

FIG. 4 illustrates a flowchart of a method 400 for processing job requests. The method 400 has been described implicitly in the above description of FIGS. 2 and 3, but is now expressly set forth. Some of the acts in the method 400 are performed by the state tracking component as represented in the left column of FIG. 4 under the heading "State Tracking Component". Others of the acts in the method are performed by the software license agreement enforcer as represented in the middle column of FIG. 4 under the heading "SLA Enforcer". Yet others of the acts in the method are performed by the resource manager as represented in the right column of FIG. 4 under the heading "Resource Manager".

The method 400 includes receiving a plurality of job requests from a plurality of clients (act 411). For instance, in FIG. 2, the job processing system 210 (and in specific embodiments, the state tracking component 212) receives new job requests from tenants 201 as represented by arrow 231.

Then, the remainder of the method 400 is performed for each job request received. Specifically, the job request is persistently placed in a queue (act 412), and the state of the job of the job request is persistently tracked by placing the job request into a pending state (act 413). Furthermore, a start notification is issued (act 414).

At any given point after that, the software license agreement enforcer consults a multiple license agreements corresponding to multiple tenants (act 421), and based on this then positions the job request in a stream of job requests that are being submitted to the resource manager so as to be scheduled in a manner that the license agreements are complied with (act 422). The enforcer then issues a processing notification (act 423).

The resource manager begins processing the job request (act 431), issues a processing notification (act 432), completes the job request (act 433), and issues a completed notification (act 434).

Figure 5:
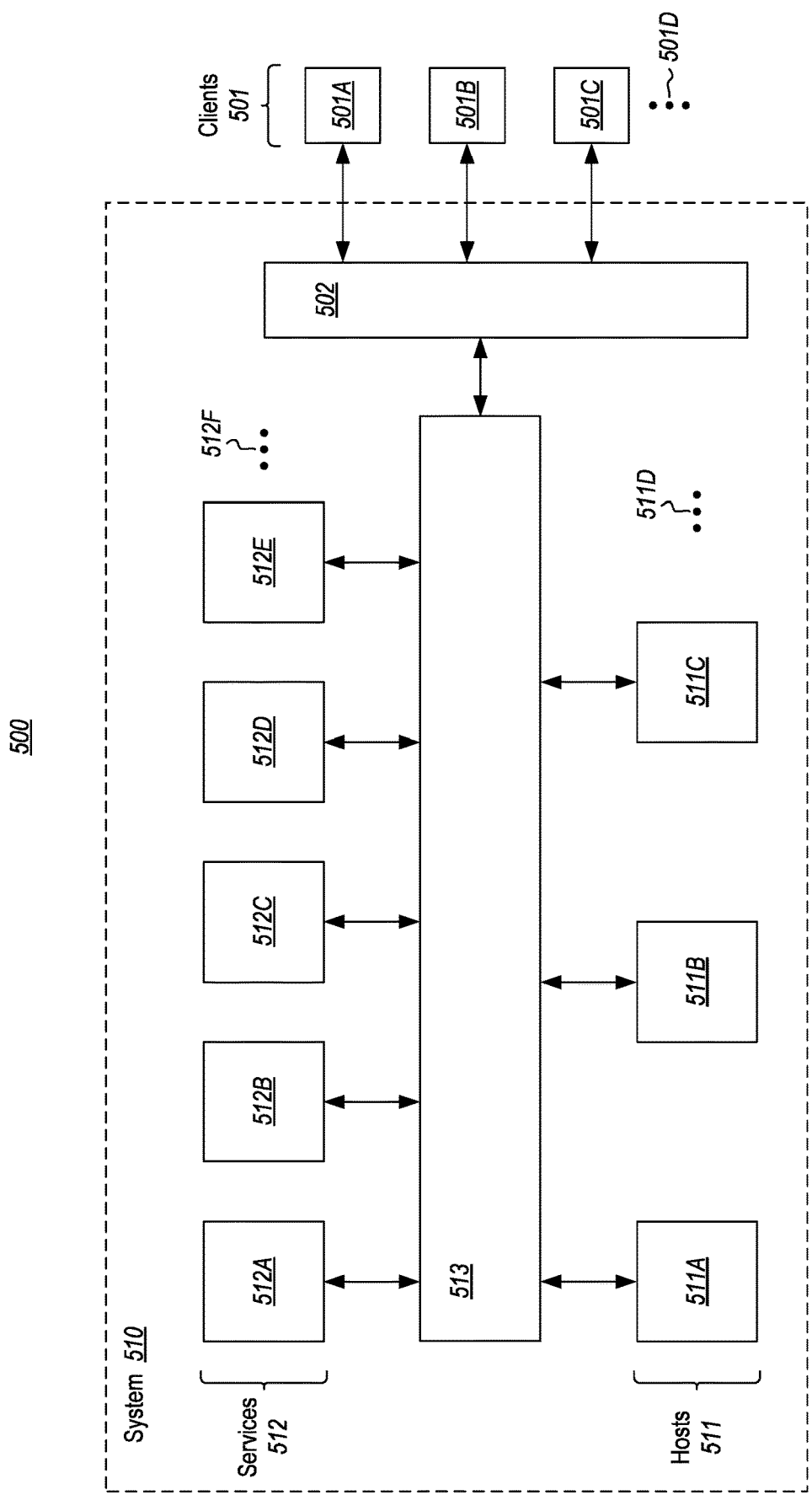
FIG. 5 abstractly illustrates an environment, such as a cloud computing environment, in which the principles described herein may be employed.

As previously mentioned, the job processing system 210 may be fully or partially practiced in a cloud computing environment. FIG. 5 abstractly illustrates an environment 500 in which the principles described herein may be employed. The environment 500 includes multiple clients 501 interacting with a system 510 using an interface 502. The environment 500 is illustrated as having three clients 501A, 501B and 501C, although the ellipses 501D represent that the principles described herein are not limited to the number of clients interfacing with the system 510 through the interface 502. The system 510 may provide services to the clients 501 on-demand and thus the number of clients 501 receiving services from the system 510 may vary over time. The system 510 represents an example of the job processing system 210 of FIG. 2. Furthermore, the clients 501 may be, for example, tenants 201 of FIG. 2 and/or may belong to one of the tenants 201 of FIG. 2.

Each client 501 may, for example, be structured as described above for the computing system 100 of FIG. 1. Alternatively or in addition, the client may be an application or other software module that interfaces with the system 510 through the interface 502. The interface 502 may be an application program interface that is defined in such a way that any computing system or software entity that is capable of using the application program interface may communicate with the system 510.

The system 510 may be a distributed system, although not required. In one embodiment, the system 510 is a cloud computing environment. Cloud computing environments may be distributed, although not required, and may even be distributed internationally and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The system 510 includes multiple hosts 511, that are each capable of running virtual machines. Although the system 500 might include any number of hosts 511, there are three hosts 511A, 511B and 511C illustrated in FIG. 5, with the ellipses 511D representing that the principles described herein are not limited to the exact number of hosts that are within the system 510. There may be as few as one, with no upper limit. Furthermore, the number of hosts may be static, or might dynamically change over time as new hosts are added to the system 510, or as hosts are dropped from the system 510. Each of the hosts 511 may be structured as described above for the computing system 100 of FIG. 1.

The system 510 also includes services 512. In the illustrated example, the services 500 include five distinct services 512A, 512B, 512C, 512D and 512E, although the ellipses 512F represent that the principles described herein are not limited to the number of service in the system 510. A service coordination system 513 communicates with the hosts 511 and with the services 512 to thereby provide services requested by the clients 501, and other services (such as authentication, billing, and so forth) that may be prerequisites for the requested service.

Accordingly, the principles described herein provide effective mechanisms to performing job processing, especially in environments in which machines that support the job processing may not always run continuously, such as in a cloud computing environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
one or more computer processors; and
data storage having stored therein computer executable instructions which, when executed upon the one or more processors, cause the processors to instantiate:
a queue configured to persistently store a plurality of job requests, each job request having a state, wherein each of the plurality of job requests remains in the queue at least until the each job request is set to a completed or a cancelled state;
a job state tracking component configured to persistently track the state of each of the job requests for at least a portion of a lifetime of each of at least some the plurality of job requests and control visibility of the job requests; and
a software license agreement enforcer configured to:
review the plurality of job requests in the queue, each job request being associated with a particular tenant of a plurality of tenants,
review a plurality of license agreements, each license agreement corresponding to at least one of the plurality of tenants,
select a pending job request from the queue, based at least in part on the review of the plurality of license agreements corresponding to the tenants associated with the job requests, and
provide the selected job request to a resource manager that schedules one or more compute resources that support and enable performance of the job request;
wherein, when the selected job request is provided to the resource manager for scheduling, the job state tracking component sets the selected job request in the queue to a processing state; and
wherein the selected job request remains in the queue at least until the selected job request has been updated to a completed state or a cancelled state.

2. The system in accordance with claim 1, wherein the job state tracking component is also configured to receive job requests and place the job requests into the queue.

3. The system in accordance with claim 1, wherein the system is included within a cloud computing environment.

4. The system in accordance with claim 3, wherein the queue only stores job requests that are processed by a particular data centers.

5. The system in accordance with claim 3, wherein the queue stores job request that are processed by a plurality of data centers.

6. The system in accordance with claim 1, wherein a subscriber/publisher pool is used to communicate between the job state tracking component and the software license agreement enforcer.

7. The system in accordance with claim 6,
wherein the software license agreement enforcer is configured to publish scheduling notifications into the subscriber/publisher pool when a job request is provided to a resource manager such as the resource manager for scheduling, and
wherein the job state tracking component subscribes to scheduling notifications from the subscriber/publisher pool, and is configured to change the persistent state of a particular job request in response to detecting a scheduling notification that corresponds to the particular job request.

8. The system in accordance with claim 7, the system including a plurality of job state tracking components, each configured persistently track a state of each of the job requests for at least a portion of a lifetime of each of at least some the plurality of job requests, and each subscribing to scheduling notifications from the subscriber/publisher pool, and being configured to change the persistent state of a particular job request in response to detecting a scheduling notification that corresponds to the particular job request.

9. The system in accordance with claim 6, wherein the subscriber/publisher pool is also used to communicate between the job state tracking component and the resource manager.

10. The system in accordance with claim 9,
wherein the resource manager is configured to publish processing notifications into the subscriber/publisher pool when a job request begins processing by compute resources, and is configured to publish completion notifications into the subscriber/publisher pool when a job request completes processing by compute resources,
wherein the job state tracking component subscribes to processing notifications and completion notifications from the subscriber/publisher pool, and is configured to change the persistent state of a particular job request in response to detecting a processing or completion notification that corresponds to the particular job request.

11. The system in accordance with claim 10, the system including a plurality of job state tracking components, each configured persistently track a state of each of the job requests for at least a portion of a lifetime of each of at least some the plurality of job requests, and each subscribing to processing and completion notifications from the subscriber/publisher pool, and being configured to change the persistent state of a particular job request in response to detecting a processing or completion notification that corresponds to the particular job request.

12. The system in accordance with claim 10, the system including a plurality of resources managers that each schedules compute resources that support each of the job requests that are submitted to the corresponding resource manager, each of the plurality of resource managers being configured to publish processing notifications into the subscriber/publisher pool when a job request begins processing by compute resources, and being configured to publish completion notifications into the subscriber/publisher pool when a job request completes processing by compute resources.

13. The system in accordance with claim 6, wherein the job state tracking component is configured to publish start notifications into the subscriber/publisher pool when a particular job request is added to the queue, wherein at least one of the software license agreement component and the resource manager subscribes to start notifications.

14. The system in accordance with claim 6, wherein the job state tracking component is configured to publish cancel notifications into the subscriber/publisher pool when a particular job request is cancelled, wherein at least one of the software license agreement component and the resource manager subscribes to cancel notifications.

15. The system in accordance with claim 1, further comprising:
an autoscaler component that is configured to observe the queue and utilization of computer resources, and based on the observation, increase or decrease the compute resources available to the resource manager, and change one or more of the plurality of license agreements within agreed upon limits.

16. The system in accordance with claim 1, wherein the resource manager is pluggable.

17. The system in accordance with claim 1, wherein the compute resources available to the resource manager include computer resources within a data center.

18. The system in accordance with claim 1, wherein the compute resources available to the resource manager include tenant compute resources.

19. A method for processing job requests, comprising:
receiving a stream of job requests, each job request being associated with a particular tenant of a plurality of tenants;
persistently tracking a state of each of at least some of the job requests using a job state tracking component;
persistently placing the job requests in a queue, wherein each of the job requests remains in the queue until the each job request has been updated to a completed state or to a cancelled state;
reviewing a plurality of license agreements, each license agreement corresponding to at least one of the plurality of tenants;
reviewing the job requests in the queue, each job request being associated with a particular tenant of a plurality of tenants;
selecting a job request from the queue based at least in part on the review of the plurality of license agreements corresponding to the tenants associated with the job requests;
creating a stream of job requests to be scheduled, the stream comprising the selected job request;
submitting the stream of job requests to a resource manager for scheduling for processing, wherein the selected job request remains in the queue until the selected job request has been updated to a completed state or to a cancelled state;
managing visibility of job requests during processing of scheduled job requests by the resource manager, including setting the selected job request to an invisible state such that the selected job request is ignored during future selection of job requests to be performed while the selected job request is in the invisible state; and
notifying the job state tracking component when a job request state has changed including when the job request is processing by the resource manager, when the job request is cancelled, and when the job request has been completed by the resource manager.

20. A system comprising:
one or more computer processors; and
data storage having encoded therein computer executable instructions which, when executed upon the one or more processors, cause the processors to instantiate:
a queue configured to persistently store a plurality of job requests that await scheduling, each job request being associated with a particular tenant of a plurality of tenants and each job request having a state, wherein each of the plurality of job requests remains in the queue at least until the each job request is set to a completed or a cancelled state;
a subscriber/publisher pool;
a plurality of job state tracking components configured to persistently track a state of each of the job requests for at least a portion of a lifetime of each of at least some of the plurality of job requests, each job state tracking component subscribing to scheduling notifications, processing notification and completion notifications from a subscriber/publisher pool, control visibility of the one or more job requests during processing of the job requests, and being configured to change the persisted state of a particular job request in response to detecting a scheduling, processing, and completion notification that corresponds to the particular job request;
a software license agreement enforcer configured to review the plurality of job requests in the queue, review a plurality of license agreements, each license agreement corresponding to at least one of the plurality of tenants,
select a pending job request to be performed based at least in part on the review of the plurality of license agreements corresponding to the tenants associated with the job requests, and
provide the selected job request to a resource manager that schedules one or more compute resources that support and enable performance of the job request;
wherein, when the selected job request is provided to the resource manager for scheduling, the job state tracking component sets the selected job request to a processing state such that the software license agreement enforcer ignores the selected job request is ignored during future selection of job requests to be performed while the selected job request in the processing state,
wherein the selected job request remains in the queue until the selected job request has been updated to a completed state or to a cancelled state, and wherein the resource manager is configured to publish processing notifications into the subscriber/publisher pool when a job request begins processing by compute resources, and is configured to publish completion notifications into the subscriber/publisher pool when a job request completes processing by compute resources.

* * * * *